United States Patent Office 3,441,156
Patented Apr. 29, 1969

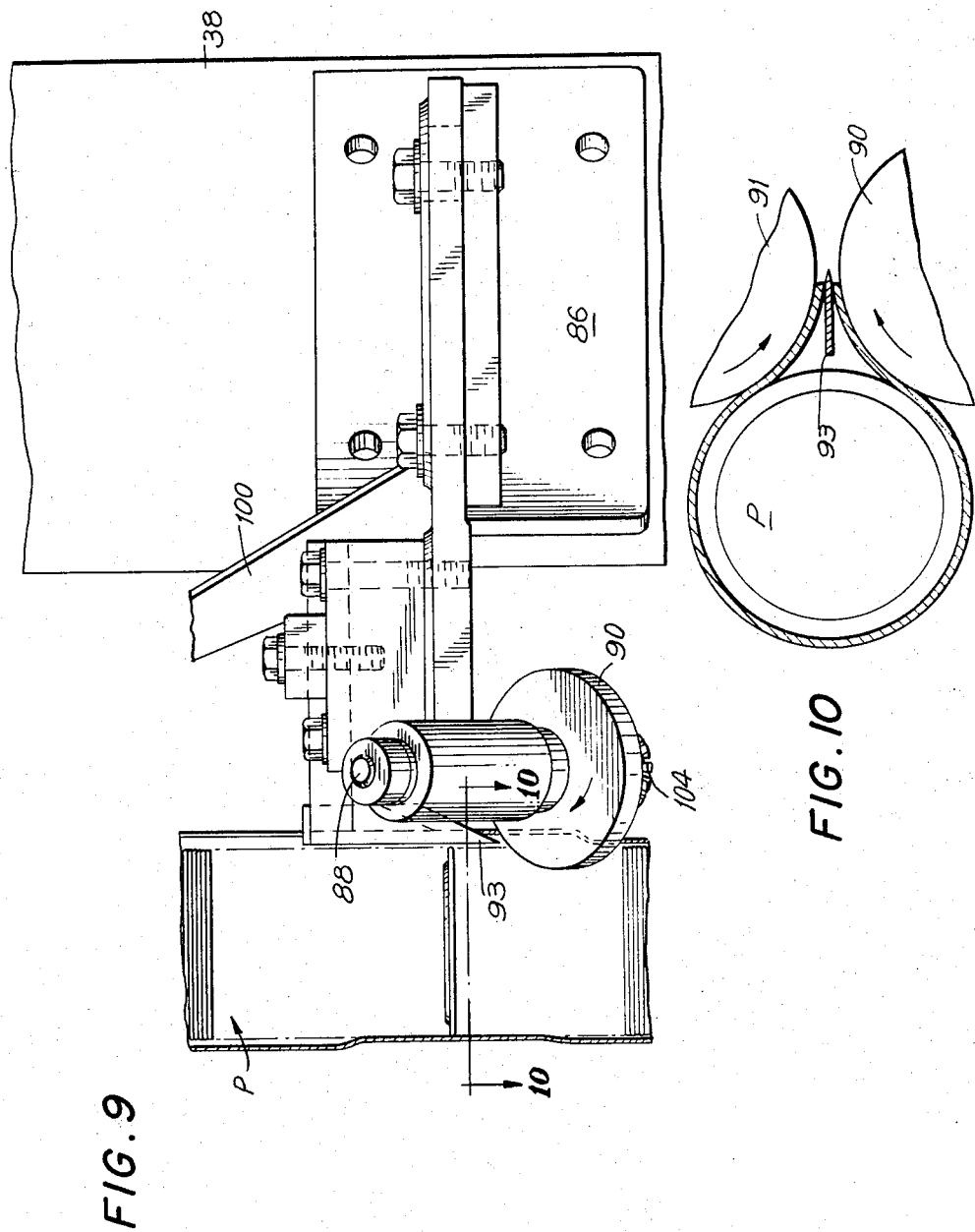

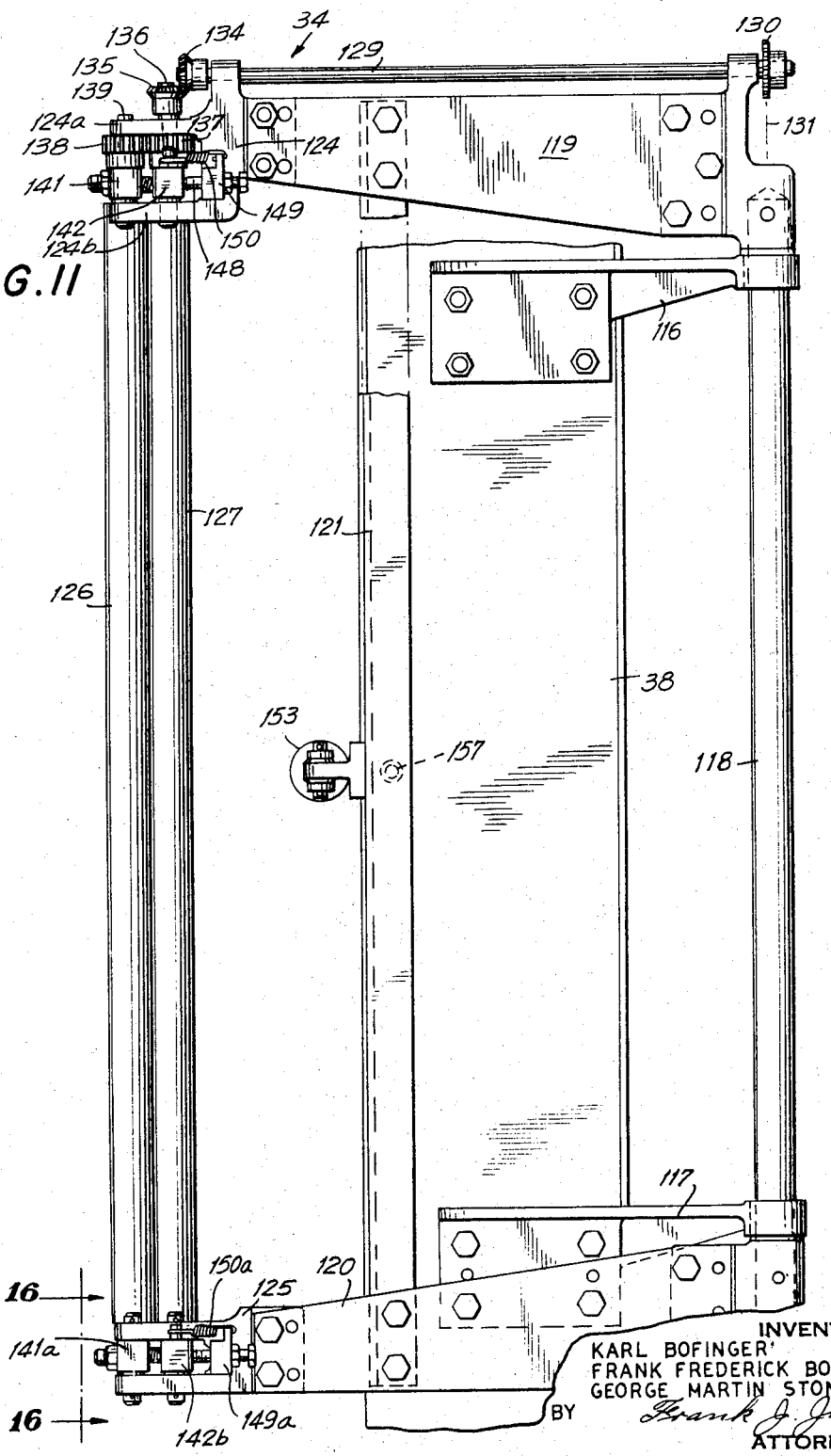

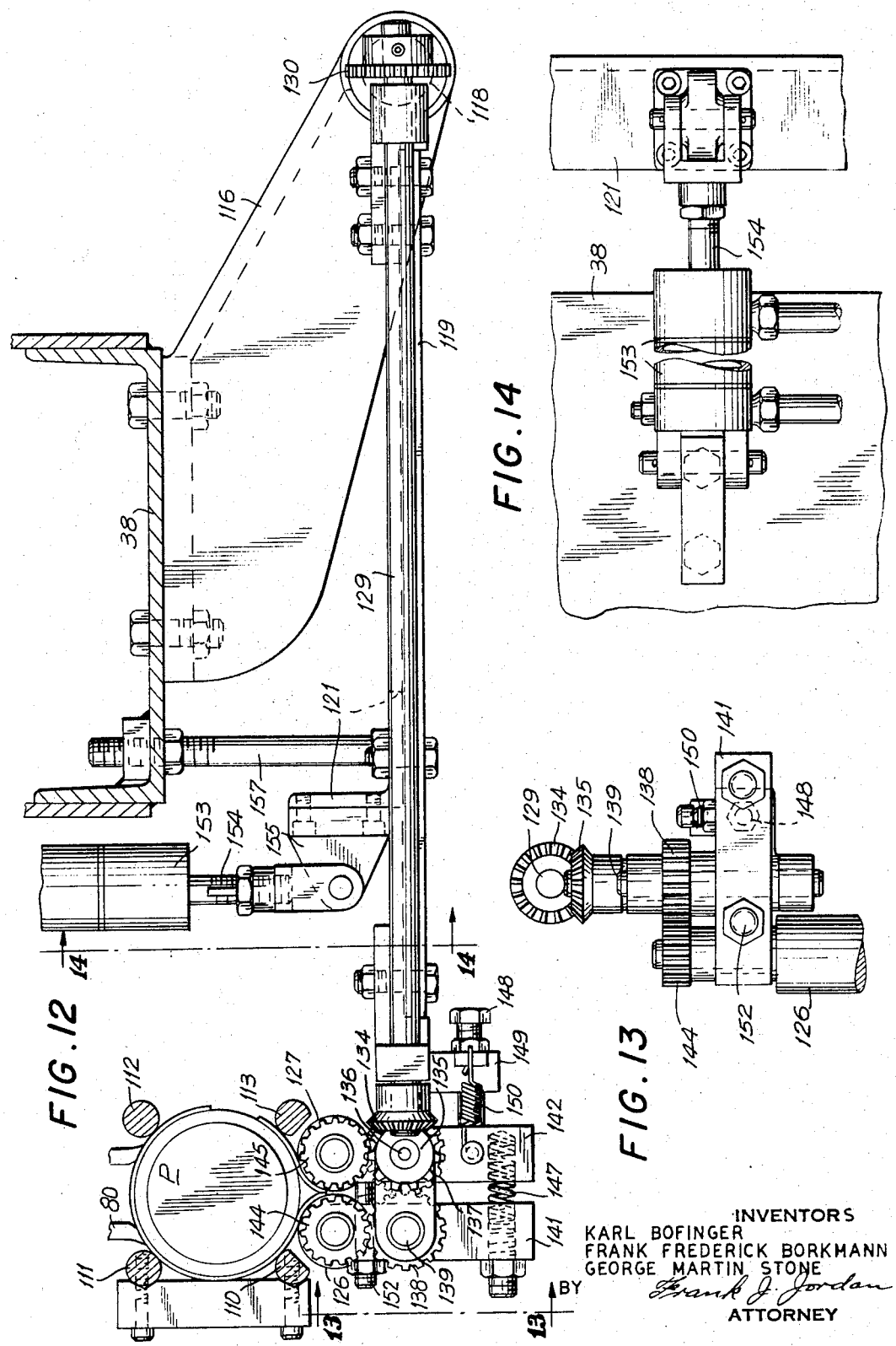

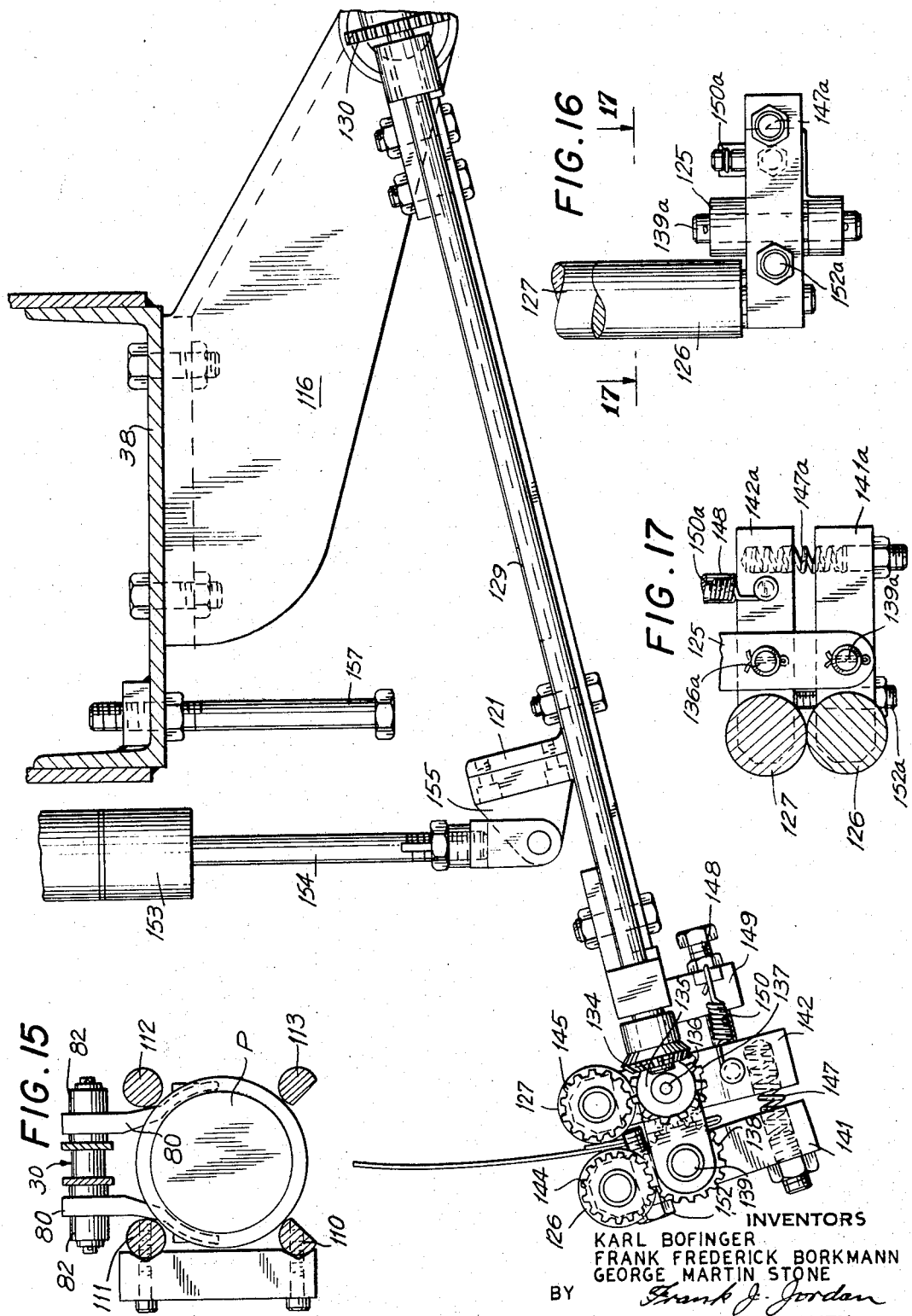

3,441,156
END FEEDING APPARATUS AND METHOD
Karl Bofinger, Cincinnati, Ohio, and Frank Frederick Borkmann, Union, and George Martin Stone, Midland Park, N.J., assignors to American Can Company, New York, N.Y., a corporation of New Jersey
Filed Feb. 3, 1967, Ser. No. 613,806
Int. Cl. B65b 69/00, 21/02; B65g 47/18
U.S. Cl. 214—305                                    24 Claims

ABSTRACT OF THE DISCLOSURE

In removing an outer wrapping from a package of end closures or like articles, the package is moved along its axis as the outer wrapping is gathered and severed longitudinally along the side, the severed wrapping subsequently being stripped from around the articles.

BACKGROUND OF THE INVENTION

This invention relates to an apparatus and method for handling packaged articles and is particularly useful for removing an outer wrapping from a package containing articles to be fed to an automatic high-speed machine. Although not limited thereto, the invention is particularly adaptable for removing the outer wrapping from a package of disc-like container end closures as they are fed to a closing machine which affixes them to the ends of container bodies.

According to prevailing practices, closure ends, after being manufactured, are stacked one upon the other and enclosed in a paper bag or wrapping to form a longitudinally extending package. Large quantities of these package ends are shipped to packers for application to can bodies in can closing machines. Under present practice, the paper wrappers are manually removed from the end closure packages as the latter are placed in the feed magazine of the closing machine. Because of the increasingly high speeds at which closing machines are being operated, it is becoming increasingly difficult for the machine operator to strip the packages of their paper wrappings at a sufficient rate of speed to keep the closing machine adequately supplied with ends. To overcome this problem, the present invention provides a method and apparatus which makes it possible to automatically remove the paper wrappings from the packed ends so that the necessity of having to manually strip them from the packages is eliminated.

SUMMARY OF THE INVENTION

A longitudinal package containing a plurality of articles (e.g., end closures) is moved along its longitudinal axis by a conveyor arrangement. Disposed along the path of travel of the package is a gathering and sliding means operable to gather the outer wrapping from around the package and sever such gathered wrapping longitudinally along a side thereof without damaging the articles. Thereafter, wringing means are operable to strip the severed wrapping from around the articles, the arrangement permitting the package and articles to be continuously moved as the wrapping is severed and stripped.

DESCRIPTION OF THE DRAWINGS

FIG. 9 is a partial elevational view looking along the line 9—9 of FIG. 7.

FIG. 10 is a fragmentary sectional view taken substantially along the line 10—10 of FIG. 9.

FIG. 11 is an elevational view of the wringer roll mechanism for stripping the paper from the package.

FIG. 12 is plan view of the mechanism shown in FIG. 11.

FIG. 13 is a fragmentary end view of the wringer roll mechanism looking along the line 13—13 of FIG. 12.

FIG. 14 is a vertical sectional view taken substantially along the line 14—14 of FIG. 12 and showing the power cylinder for pivoting the wringer roll mechanism into and out of position adjacent the package.

FIG. 15 is a plan view similar to FIG. 12 but showing the wringer roll mechanism pivoted away from the package.

FIG. 16 is a partial elevational view looking substantially along the line 16—16 of FIG. 11.

FIG. 17 is a sectional view taken along the line 17—17 of FIG. 16.

DESCRIPTION OF THE PREFERRED EMBODIMENTS

Figure 1:
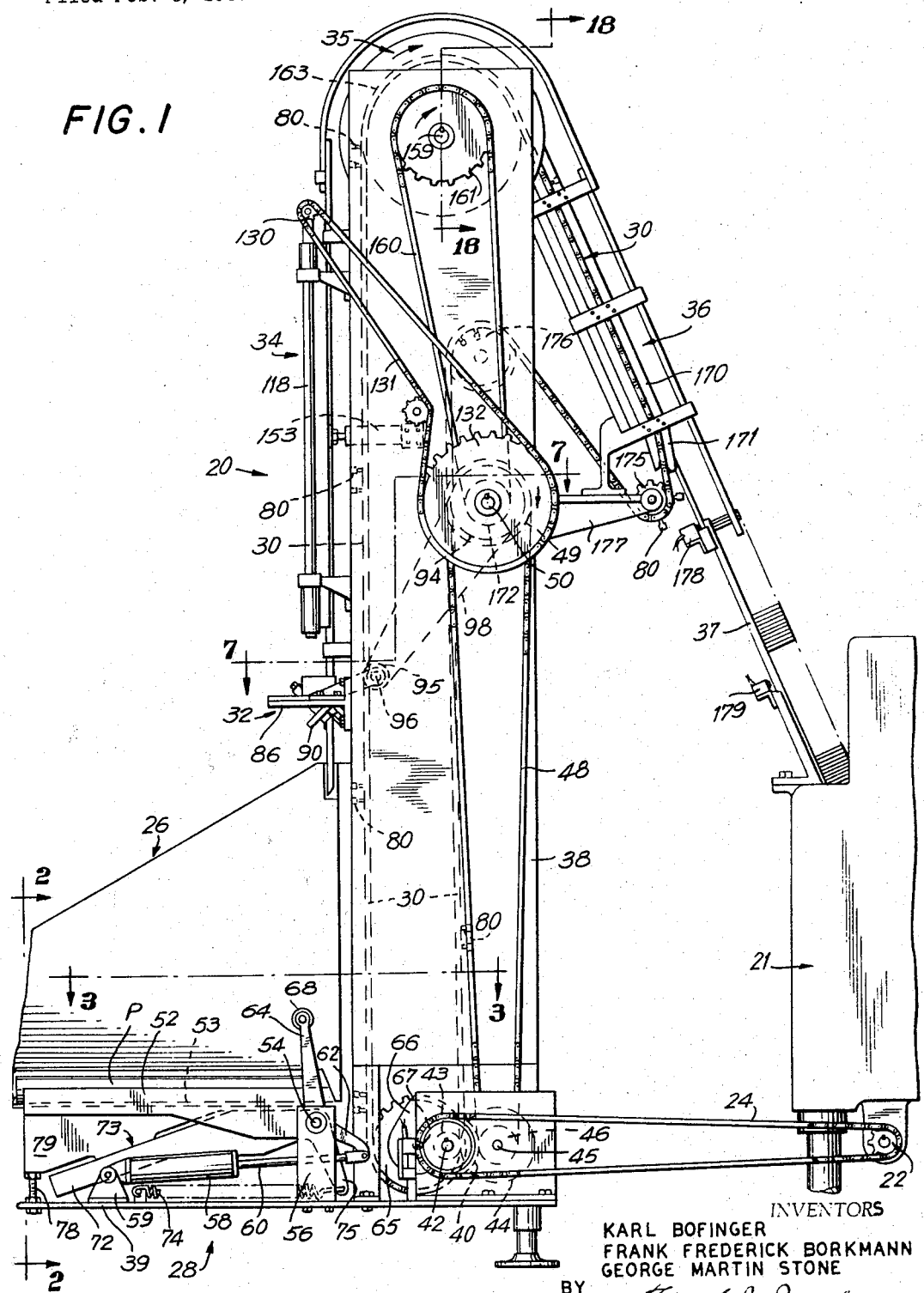
FIG. 1 is a front elevational view of an end feeding machine constructed according to one embodiment of this invention.

Referring to the drawings, FIG. 1 shows an end feeding machine 20 constructed according to one embodiment of the invention arranged to feed a supply of stacked disc-like container ends or covers to a closing machine indicated at 21. The latter machine forms no part of this invention, the articles or ends delivered by the end feeding machine 20 being adapted to be fed to various types of machines as may be desired. The drive for the end feeding machine 20 may be obtained from the closing machine 21 and suitably synchronized to ensure that the proper amount of ends will be fed to the closing machine 21 as they are used up in the latter. This drive may be taken from a sprocket 22 driven by the closing machine 21, the sprocket 22 driving the end feeding machine 20 by the chain 24 as will be further described.

Longitudinally extending paper covered packages P of container ends are placed, with their longitudinal axes horizontally disposed, into an inclined chute, indicated generally at 26, from which they roll into an uprighting mechanism indicated generally at 28. This latter mechanism is operable to receive each successive package P at the lower extremity of the chute 26 and upright it, that is, place the package in a position with its longitudinal axis vertically disposed. Thereafter, the vertically disposed package is carried upwardly by a conveying mechanism 30, past a gathering and slitting means indicated generally at 32. This latter means is operable to gather part of the paper covering or wrapping of the package into a bulge so that a knife may cut or sever the wrapping at the bulge as the package is lifted vertically by the conveying means 30.

The package with the severed wrapping is then carried to the wringer mechanism, indicated generally at 34, which strips the severed paper wrapping from around the container ends and discharges said wrapping into a receptacle. The container ends, free of their outer wrapping, are then fed by the conveying means 30 to a turnover wheel 35 and thence to a discharge chute 36 which in turn supplies the feed chute 37 of the closing machine 21.

From the above general description it will be seen that the end feeding machine 21 is operable to receive a plurality of packages within a feed chute 26, to take successive individual packages and upright them, to carry each uprighted package past operating mechanisms which strip the covering from around the ends, and thereafter feed the ends to a supply chute of a closing or like machine which utilizes the ends in its operation.

Turning to more details of construction, the end feeding machine 21 comprises a frame structure 38 and base 39 which support various operating mechanisms and drives as will be described. As previously indicated, the drives for the various operating mechanisms are synchronized with the closing machine 21. As shown in FIG. 1, the chain 24 driven by the closing machine sprocket 22 in turn drives a sprocket 40 supported from the base 39. The shaft 42 mounting the sprocket 40 carries a gear 43 meshing with a larger gear 44 also rotatably mounted on the base 39 of the machine. The shaft 45 for the gear 44 carries a sprocket 46 which in turn drives a chain 48 operable to drive sprocket 49 on a shaft 50 rotatably mounted in a higher position of the frame 38 as shown in FIG. 1. The shaft 50 in turn mounts the various sprockets for driving the operating mechanisms as will be described. A magnetic or other type clutch (not shown) may be mounted, in part, on the shaft 42 and interdisposed between the sprocket 40 and gear 43 to disengage the end end feeding machine 20 from the closing machine 21. The magnetic clutch may be used to prevent inadvertent overfeeding of ends to the closing machine 21, suitable sensing devices, as will be described, being provided to disengage the magnetic clutch should over-feeding occur. The various drives for the operating mechanisms will be described in detail, but for the time being it will be apparent that the shaft 50 on which various sprocket wheels are mounted is driven directly from the closing machine 21 through a magnetic clutch.

*Uprighting mechanism*

Figure 2:
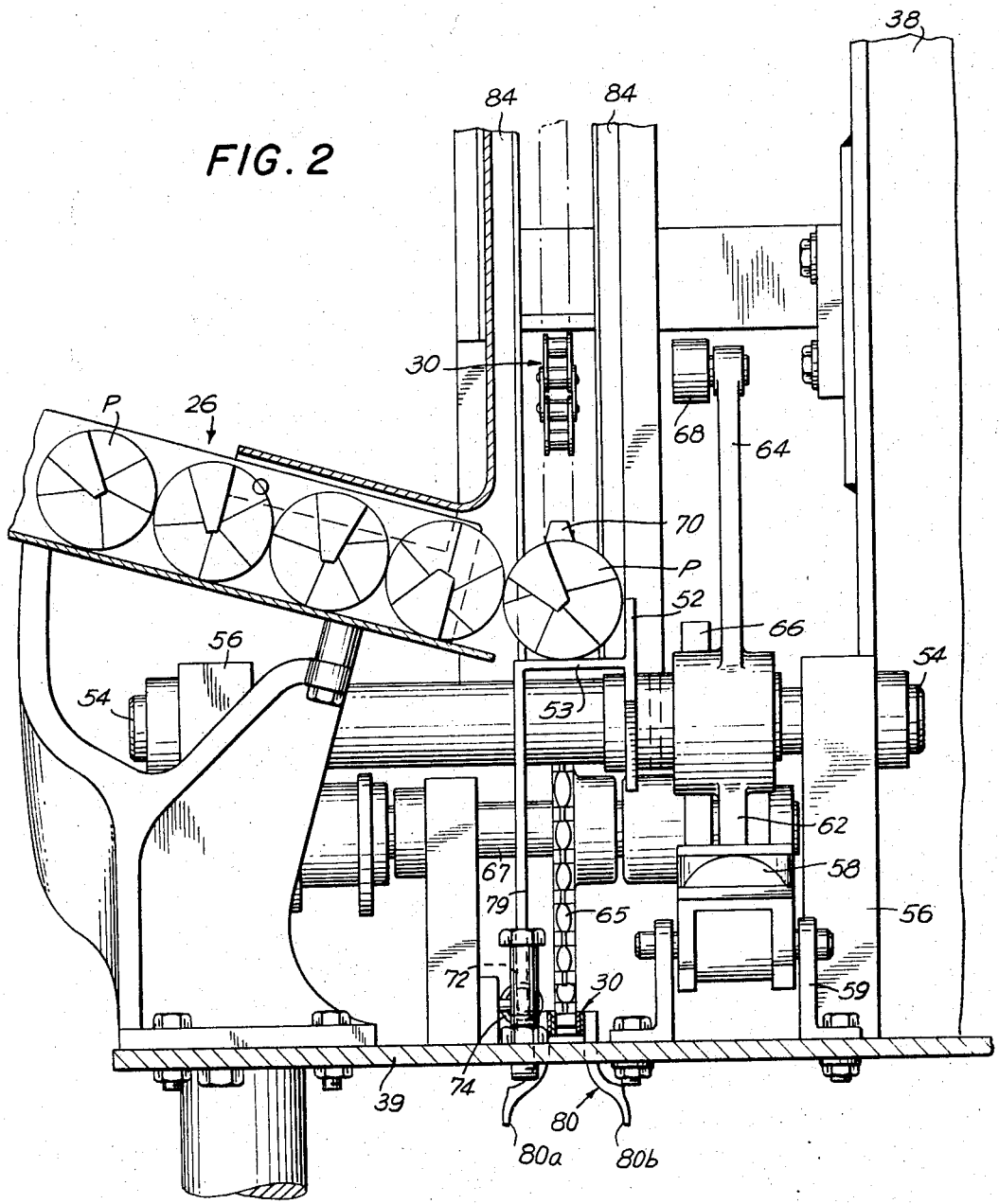
FIG. 2 is a partial side elevational view taken substantially along the line 2—2 of FIG. 1.

Referring to FIGS. 1–6, the uprighting mechanism 28 comprises a tray 52 having a shelf 53 which receives horizontally disposed packages P from the bottom of the inclined chute 26 as best shown in FIG. 2. The tray 52 is pivotally mounted on a shaft 54, the latter in turn being rotatably mounted on supports 56 extending from the base 39 of the machine. A power cylinder 58 having one end pivotally mounted to the base 39 by the bracket 59 has a piston rod 60 pivotally connected to an arm 62 on the tray 52. It will be apparent that the power cylinder 58 and its pistion rod 60 is operable to pivot the tray from the position shown in FIG. 4 to that shown in FIG. 5.

The tray 52 also includes an arm 64 adapted to be actuated by a cam 66 to complete the final positioning of the tray in its upright position. The cam 66 is carried on a shaft 67 supported from the base 39 of the machine. A sprocket 65 on which the conveyor chain 30 is carried is also mounted on shaft 67 whereby the chain 30 rotates the cam 66, the latter being operable to engage a roller-follower 68 on the end of arm 64 and control pivoting of the tray from the position shown in FIG. 5 to that shown in FIG. 6. The amount of pivotal movement effected by the cam 66 may be varied as desired, but in the illustrated embodiment it amounts to approximately 10% of the total pivotal movement or approximately 9 degrees. The cam 66 thereby serves to ease the tray 52 into its vertical position in timed relation with the chain 30 so that the latter will readily pick up the vertical package, and carry it upwardly as will be described.

The tray 52 has a support tab 70 extending at right angles to the general plane of the tray shelf 53 which serves to support the longitudinal end of each package as the latter is being uprighted and before transfer to the conveyor chain 30.

Figure 4:
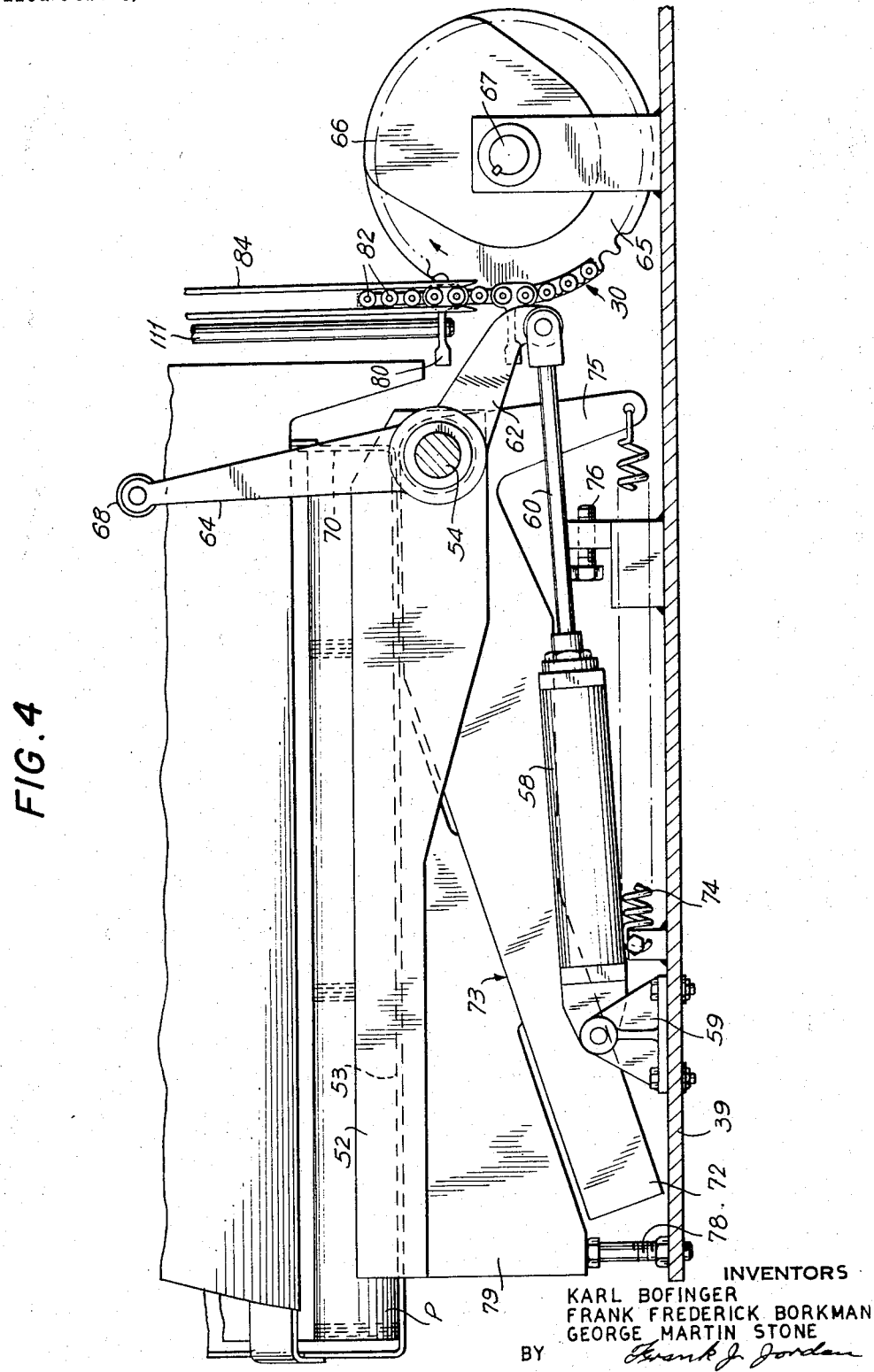
FIG. 4 is a partial front elevational view of the uprighting mechanism wherein the uprighting tray and the can end package therein are in a horizontal position.
Figure 5:
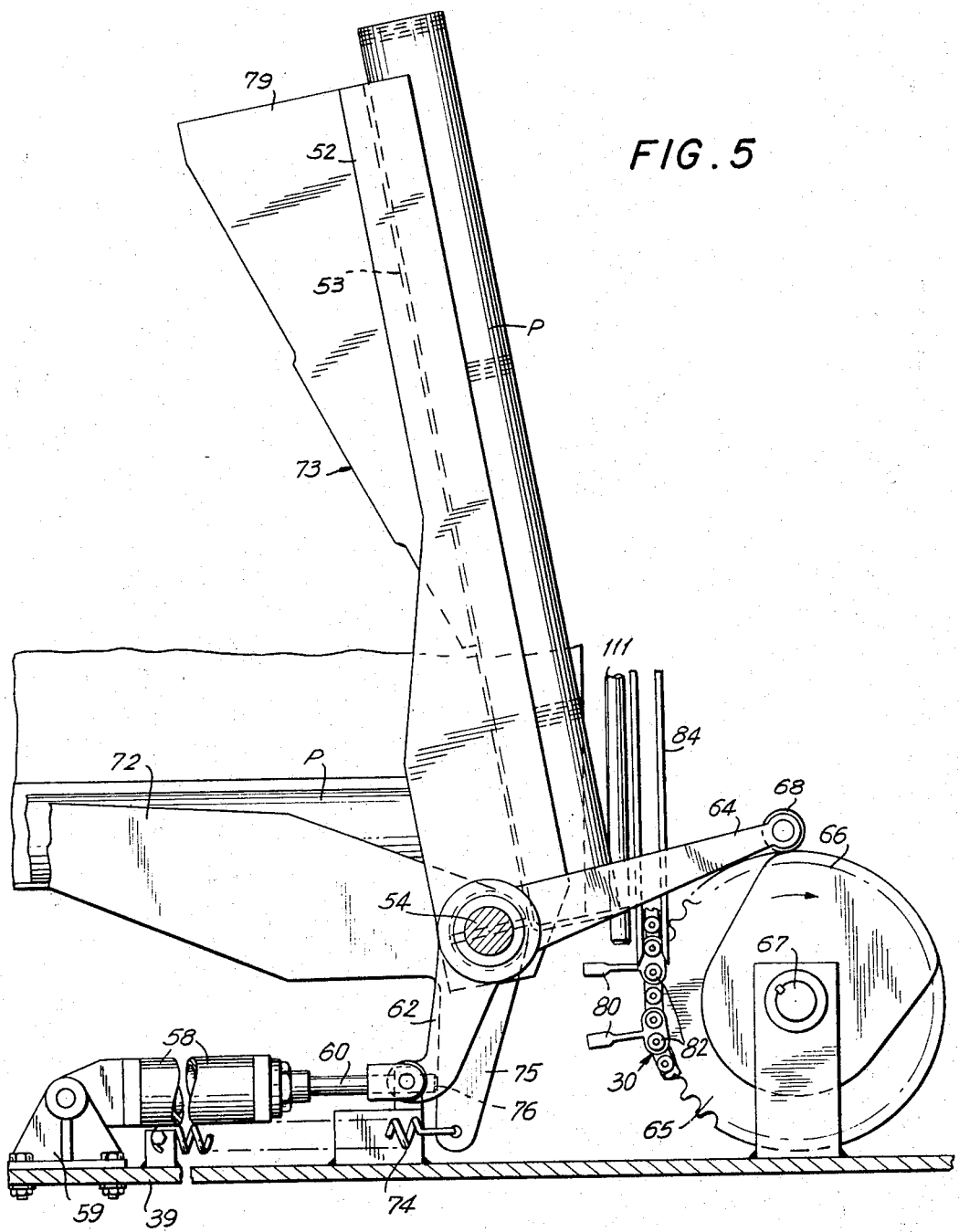
FIG. 5 is similar to FIG. 4 but showing the uprighting tray pivoted to a position wherein the package is almost vertical.
Figure 6:
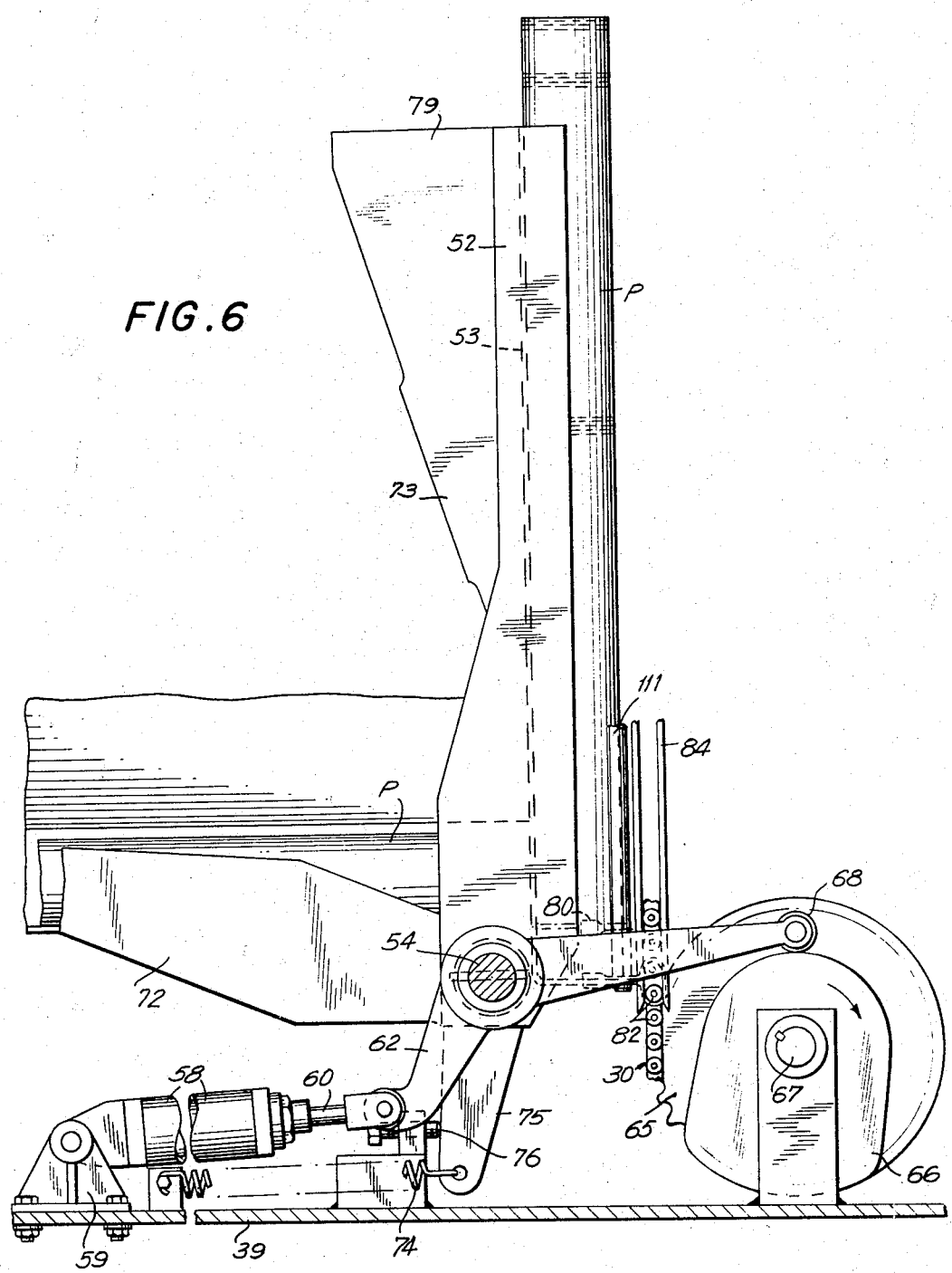
FIG. 6 is similar to FIGS. 4 and 5 but shows the uprighting tray in full upright or vertical position.

In order to prevent a succeeding package from falling into the space vacated by the tray 52 when the latter is uprighting a package, a gate 72 rises with the tray to prevent the next succeeding package from rolling down until the tray has returned to its horizontal position ready to receive the next package. The gate 72 is rotatably mounted on the same shaft 54 on which the tray 52 is mounted. A spring 74 engages an arm 75 on the gate 72 and tends to bias the latter in the position shown in FIGS. 5 and 6 wherein the arm 75 abuts an adjustable stop 76. In the position shown in FIGS. 5 and 6, the gate 72 blocks off the chute 26 and prevents a package from entering the loading position when the tray 52 is being uprighted. As the tray 52 is returned from its upright to its horizontal position (i.e. from the FIG. 6 to the FIG. 4 position), a lower flange 79 on the tray 52 engages the gate 72, as indicated at 73, and rotates the gate counter-clockwise against the bias of spring 74 to the position shown in FIG. 4 where the next succeeding package is free to roll onto the awaiting tray 52. It will be apparent that the gate 72 functions to prevent feeding of packages to the tray 52 except when the latter is in a position ready to receive the bottom package in the chute 26. As best shown in FIGS. 1 and 4, an adjustable stop 78 may be provided to abut the tray flange 79 to determine the package-receiving position of the tray 52.

After the tray 52 has been placed in an upright position, one of a plurality of suitably spaced projections 80, each defined by fingers 80a and 80b (see FIG. 2 for example), carried by a conveyor chain 30 is operable to engage the outer edge or periphery of the bottom of the upright package, pick up the latter from the tray support tab 70, and carry the package vertically upwardly. The conveyor chain 30 is provided with rollers 82 on each side (see FIG. 3 for example) which are carried in guides 84 supported from the frame 38 during the vertical upward run of the conveyor chain 30.

The conveyor chain 30 carries the upright package to the gathering roll and slitting mechanism 32 where the covering of the package is gathered or bunched and cut longitudinally.

*Gathering rolls and slitting mechanism*

The gathering rolls and slitting mechanism, shown in FIGS. 7–10, includes a bracket 86 suitably mounted to the frame 38 and adjustably mounting a pair of spindles 88, 89 carrying gathering rolls 90 and 91, respectively. The spindles 88, 89 are arranged with their axes converging so that each gathering roll 90 and 91 rotates in a direction tending to draw the package wrapping between the two gathering rolls (see FIG. 10 for example) while at the same time applying an upward vertical component to the wrapping to facilitate drawing the latter upwardly against the cutting edge of a knife 93 disposed between the two rolls.

Figure 7:
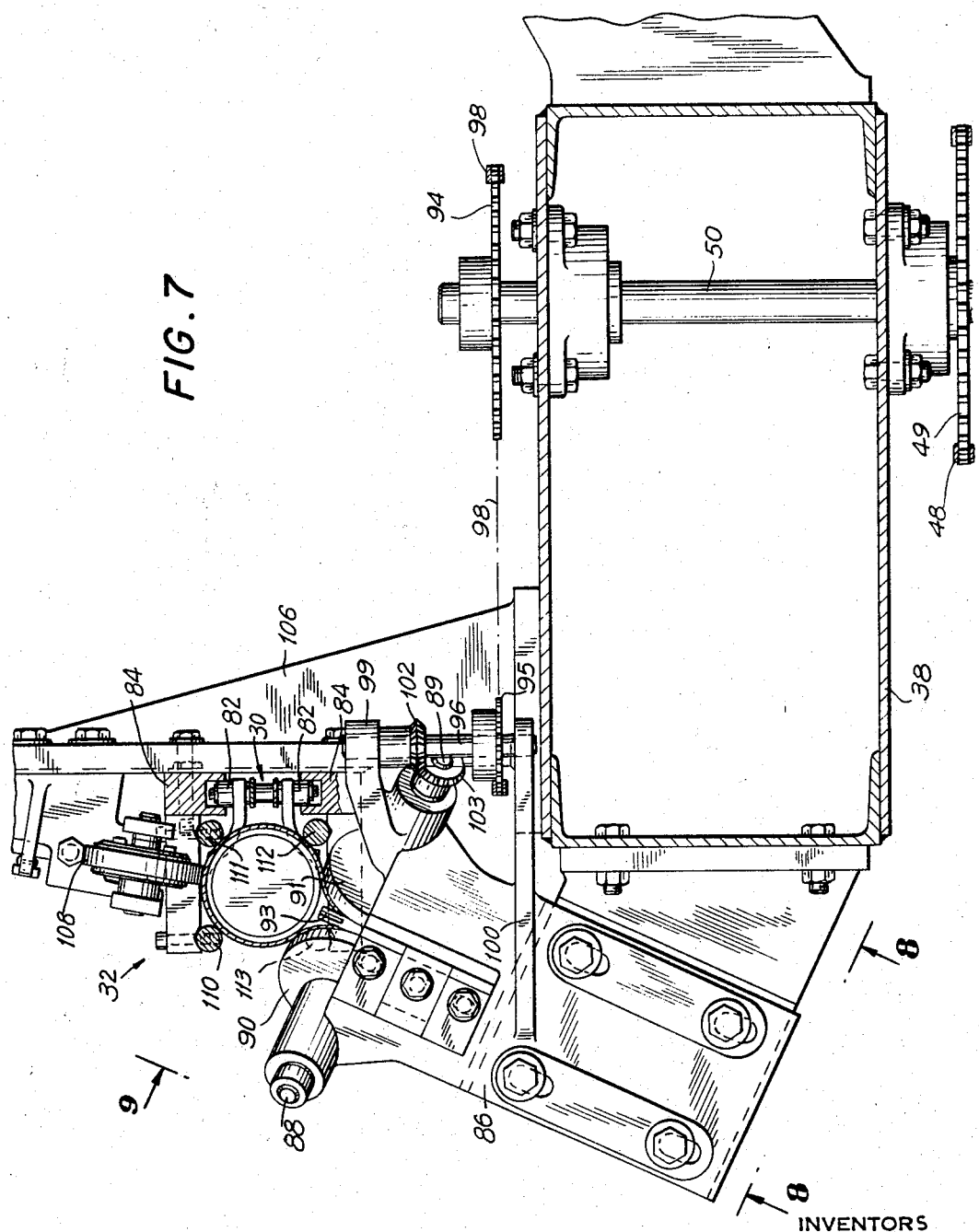
FIG. 7 is a horizontal sectional view taken substantially along the line 7—7 in FIG. 1 and showing details of the gathering rolls and slitting mechanism.
Figure 8:
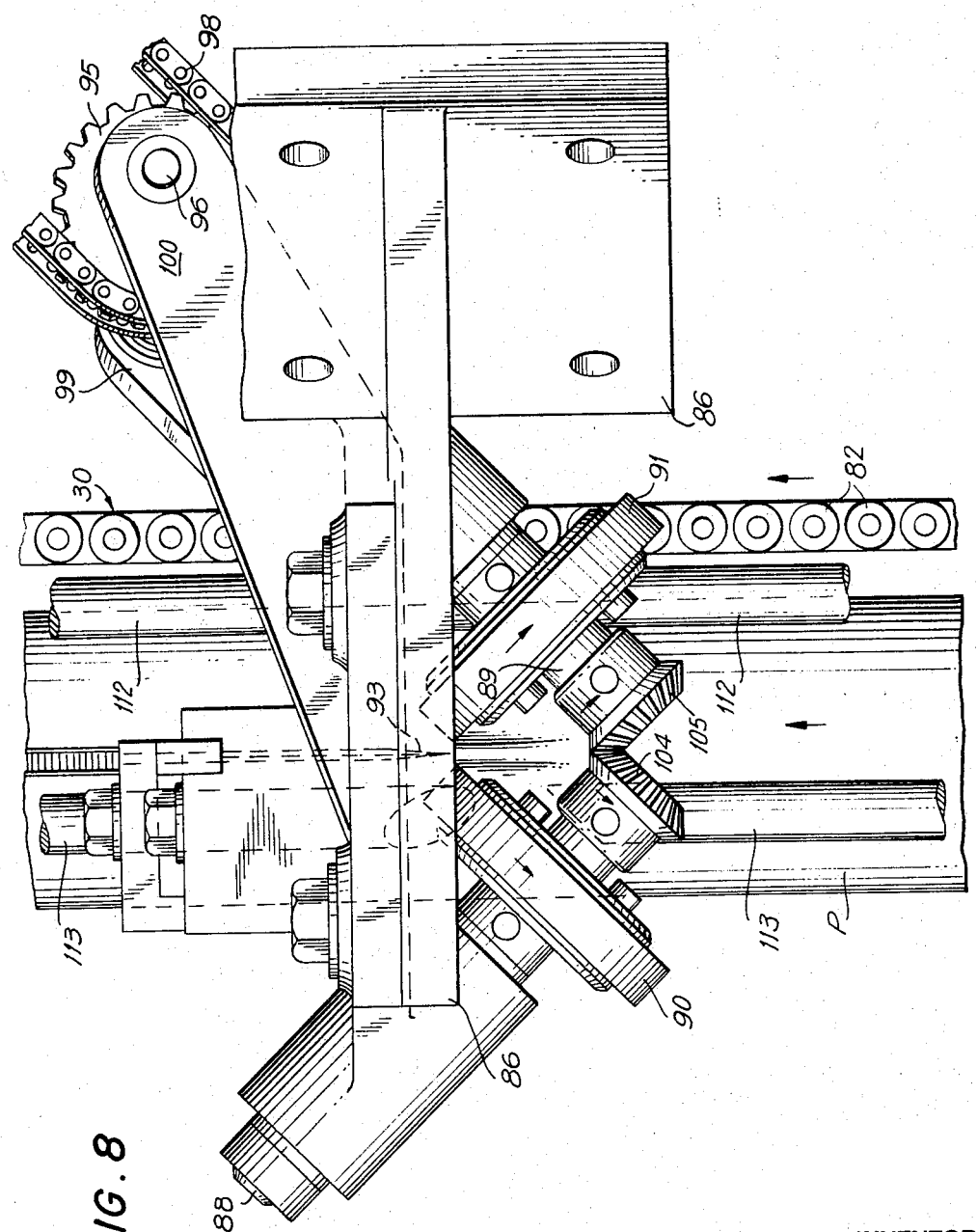
FIG. 8 is a partial elevational view of the gathering rolls and slitting mechanism looking along the line 8—8 of FIG. 7.

The drive for gathering rolls 90, 91 consists of a sprocket 94 affixed to the shaft 50, previously mentioned (see FIG. 1, for example), which drives a sprocket 95 on a shaft 96 through a chain 98. The shaft 96 is rotatably supported on the arms 99 and 100 which extend from bracket 86 as best shown in FIG. 7. The spindle 89 for gathering roll 91 is driven by an angled geared drive comprising the gear 102 on shaft 96 meshing with gear 103 on spindle 89. The other spindle 88, in turn, is driven by the first spindle 89 by means of an angled drive consisting of gears 104 and 105 mounted on spindles 88 and 89, respectively as best shown in FIG. 8.

Also mounted on the frame 38 is a bracket 106 rotatably mouting a backing roller 108 as best shown in FIG. 7. The backing roller 108 which rotates about an axis perpendicular to the path of travel of the longitudinal package, rolls along the side of the package and functions to support the package as the latter is acted on by the gathering rolls 90, 91. Also the backing roller 108 holds the contacted section of the paper wrapping in place so that the latter will be drawn in approximately equal amounts from each diametrical half of the package. It will be observed in FIG. 7 that conveyor chain guides 84, previously mentioned (see FIG. 3 for example), support the rollers 82 of conveyor chain 30 in a predetermined position so that the package will be conveyed in the desired position to be acted on by the gathering rolls 90 and 91. Suitable vertical guide rods 110, 111, 112 and 113 (FIG. 7) spaced around the package guide and support the latter in its upward travel past the gathering rolls and slitting means. The guide rod 113 has a break in it so as not to interfere with the gathering roll 90.

The knife 93, previously mentioned, is adjustably mounted on the bracket 86 to extend between the gathering rolls 90, 91. In this position the knife 93 cuts or severs the paper covering which has been gathered to form a bulge between the two gathering rolls 90, 91. The knife 93 slits the package longitudinally as the latter is carried upwardly by the conveyor chain 30.

From the above description it will be apparent that as the conveyor 30 carries the package vertically upwardly, two gathering rolls 90, 91 has an upward component form a bulge whereby the knife 93 between the rolls makes a longitudinal cut in the bulge along the side of the package. The angular disposition of the axis of the two gathering rolls 90, 91 has an upward component serving to direct the gathered or bulged paper covering up against the knife 93.

After passing the gathering rolls and slitting mechanism 32, the package is carried to the wringing roll mechanism where, as previously mentioned, the severed paper is removed from around the package.

*Wringing roll mechanism*

The wringing roll mechanism 34 is best shown in FIGS. 11 to 17. A pair of brackets 116, 117 mounted on the frame 38 mounts a vertically disposed shaft 118, the latter, in turn, pivotally mounting a pair of brackets 119, 120 which are interconnected by the strut 121. The brackets 119 and 120 carry U-shaped end pieces 124 and 125 respectively, which in turn serve to support two wringing rolls 126 and 127 in a manner to be described. The upper bracket 119 rotatably mounts a shaft 129, the latter in turn carrying a sprocket 130 which is driven by a chain 131 (FIG. 1) and a sprocket 132 mounted on the drive shaft 50 previously mentioned.

The shaft 129 drives an angle gear 134, the latter meshing with an angle gear 135 which is mounted on a shaft 136. The shaft 136 mounts a spur gear 137 meshing with a spur gear 138 mounted on shaft 139. The shafts 136 and 139 are rotatably mounted in the vertically spaced arms 124a and 124b of the previously mentioned U-shaped end piece 124 as shown in FIG. 11. Each shaft 139 and 136 pivotally supports a bar 141 and 142 respectively, extending generally at right angles to the shaft 129. An end section of each bar 141 and 142 rotatably mounts the upper ends of each wringer roll 126 and 127 respectively, said upper ends of each wringer roll having spur gears 144 and 145 respectively (FIG. 12) meshing with the spur gears 138 and 137 previously mentioned. It will be apparent, therefore, that the shaft 129 is operable to rotate the wringer rolls 126, 127.

The wringer rolls 126 and 127 are urged towards one another by the bias of spring 147. As best shown in FIG. 12 the spring 147, under compression, tends to pivot both bars 141 and 142 above shafts 139 and 136 respectively to urge the wringer rolls 126, 127 together.

In order to adjust the position of the two wringer rolls 126, 127 to locate them in a proper position to engage the paper wrapping as will be described, a threaded member functioning as an adjustable stop 148 is threaded to an extension 149 on the U-shaped end piece 124 to engage the bar 142 at a location spaced from its support shaft 136. A coil spring 150 between the extension 149 and the bar 142 urges the latter against the stop 148. A threaded member functioning as an adjustable stop 152 (see FIG. 12 for example) is threaded in the bar 141 and abuts the bar 142 to adjust the distance or contact pressure between the two wringer rolls 126, 127. It will be apparent, therefore, that adjusting the stop 148 will pivot both bars 141 and 142 as a unit to position the wringer rolls in a proper position adjacent the package and further that, adjusting the stop 152 will vary the distance or contact pressure between the two wringer rolls 126 and 127.

The lower ends of the wringer rolls 126, 127 are supported in manner similar to that previously described in connection with the upper mounting and accordingly, will not be described in detail. However, corresponding parts in the lower mounting have been identified in the drawings with the same numerals as those in the upper mountings except the suffix "a" has been added.

The vertical guide rods 110 to 113 (FIG. 12), previously mentioned, guide and support the package as the latter is conveyed upwardly by the conveyor chain 30 and the covering removed therefrom.

As will be evident by comparing FIGS. 12 and 15, the wringer roll assembly is operable to be pivoted about the shaft 118 between the two positions shown. In FIG. 12 the assembly is in a position to engage and remove the wrapping from around the package. In this position it will be evident that as the wringer rolls 126, 127 are rotated as previously described, they engage the paper wrapping and pull the latter therebetween, the two wringer rolls separating slightly as may be required to accommodate the paper wrapping. Such separation is effected by the pivotal movement of the bars 141 and 142 against the bias of spring 147. As the wrapping is received between the wringer rolls 126, 127 the wringer roll assembly is pivoted to the position shown in FIG. 15. This pivotal movement is effected by a power cylinder 153 operating a piston rod 154 which is pivotally connected to a bracket 155 affixed to the upright strut 121 between the two brackets 119 and 120 (see FIG. 11). The operating position (FIG. 12) of the wringer roll assembly is determined by an adjustable stop 157 threaded to the main frame 38 and abutting the upright strut 121.

The wringer roll assembly is pivoted between the two positions shown in FIGS. 12 and 15 in timed sequence with the positioning of the projections 80 on conveyor chain 30 so that when a rising package is in the proper position adjacent the wringer rolls, the latter, in the FIG. 12 position, will quickly remove the paper and be pivoted to the FIG. 15 position. At the same time the next succeeding package is being conveyed upwardly by the conveyor 3 into position so that it will be in a proper position to have its paper wrapping removed after the wringer roll assembly has returned to its FIG. 12 position. The controls for actuating the power cylinder 153 will be described hereinafter.

Figure 18:
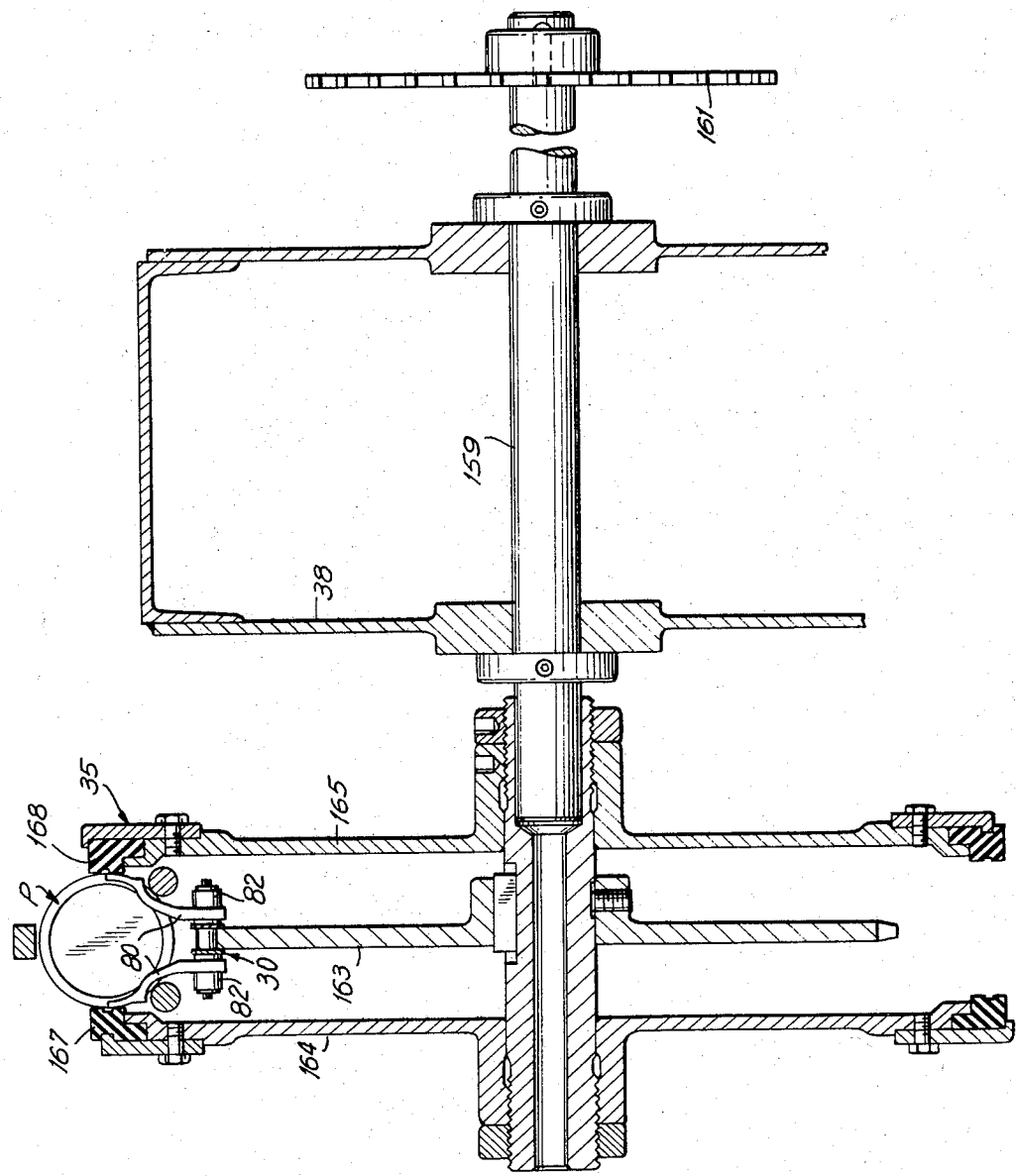
FIG. 18 is a sectional detail taken along the line 18—18 of FIG. 1.

With the wrapping removed from around the container ends, the latter, stacked one above the other are conveyed upwardly by the conveyor chain 30 to the turnover wheel 35 (see FIGS. 1 and 18) mounted on shaft 159 which is supported on the main frame 38 and which is driven off the main drive shaft 50, previously mentioned (see FIG. 1), by the chain 160 and sprocket 161. The upper sprocket 163 for the main conveyor chain 30 is housed between two spaced plates 164, 165 (FIG. 18) defining the turnover wheel 35 and is also driven by the shaft 159 as best shown in FIG. 18. The turnover wheel 35 has resilient (e.g. rubber) annular pads 167 and 168 suitably mounted on the plates 164, 165 which are operable to engage the sides of the container ends and hold them in place as they are carried up over the turnover wheel 35. After the container ends have been carried over the top, they pass into the chute 36 but are still supported in stacked condition by a projection 80 or conveyor chain 30 which has a run along the discharge chute 36 as shown in FIG. 1. Thus, the stacked ends are guided down the chute 36 until released by one of the projections 80 on conveyor chain 30. This release is effected by withdrawing the projection 80 from under the stack of covers in the chute 36. As best shown in FIG. 1 support guides 170 (similar to the guides 84 shown in FIG. 3 for example) extend along the chute 36 and receive the rollers 82 on conveyor chain 30 and guide the latter along the chute 36. Towards the bottom of chute 36, the support guides 170 are curved slightly to the left as indicated at 171 in FIG. 1, whereby such curved portion serves to quickly withdraw the finger 80 from under the edge of the stack of covers in chute 36 and allows them to drop onto the stack 37 in the closing machine.

It wil be apparent, therefore, that the projection 80 receives and serves to support a stack of covers as they are fed into the chute 36 from the turnover wheel 35 and to ease said stack of covers down the chute 36 until the projection 80 is withdrawn. The conveyor projections 80 may be made somewhat U-shaped (see FIG. 3 for example) to contact only the flange of the container end covers. A suitable access means in the form of a hinged-door (not shown) may be provided on the chute 36 to facilitate feeding covers by hand to the chute 36 in case of failure of the end feeder machine 20.

Because of the closing machine 21 can be running without feeding closure ends, there is a possibility of build-up of covers in the cover stack 37 of the closing machine 21. To avoid this one or more detection switches may be provided, as shown at 178 in FIG. 1, to detect build-up of covers and prevent the projection 80 from running into or contacting the top of the closing machine cover stack 37. The switch 178 is operable to disengage the magnetic clutch, not shown, but previously mentioned, to stop the operation of the end feeding machine 20.

The end feeding machine 20 is driven from the closing machine 21, as previously mentioned, and since it is synchronized with the closing machine 21 it will have the same output speed as the closing machine 21. Since the end feeding machine 20 is relatively slow moving, the output speed thereof will be able to keep up with or exceed the speed of any known closing machine. A detector switch may also be provided at 179 on the feed chute 37 to indicate that more covers are required on the stack 37.

As best shown in FIG. 1 the main conveyor chain 30 is driven off the main drive shaft 50 through a sprocket 172 on shaft 50, chain 160, sprocket 161 (see also FIG. 18) on shaft 159, and sprocket 163. The main conveyor chain 30 after passing from the chute 36, passes under a sprocket 175 and then up over a sprocket 176 before continuing its downward run to the sprocket 65, previously mentioned. The sprocket 175 is supported from the main frame 38 by the bracket 177 and the sprocket 176 is supported from the main frame 38.

As shown in FIG. 1, pairs of projection 80 are suitably spaced on the main conveyor 30. The advanced finger of a pair, considering the direction of travel of the conveyor chain 30, serves to support the package and stack of covers in its upward travel, that is from the time the package is received from the uprighting mechanism 28 until the covers are carried around in the turnover wheel 35. As the covers come off the turnover wheel 35 and pass into chute 36, the other finger of a pair supports the stack of covers as they are guided down the chute 36.

Figure 3:
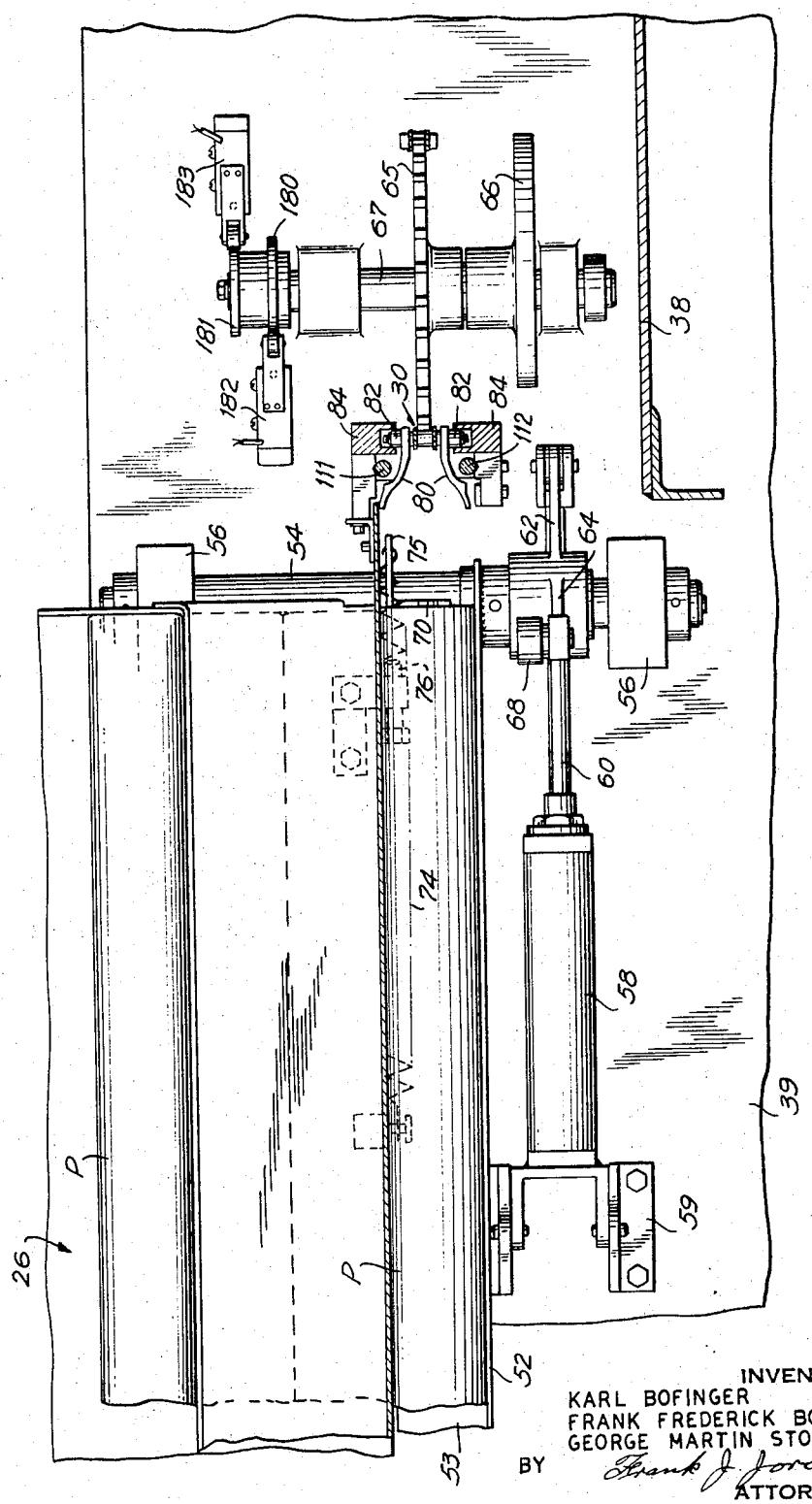
FIG. 3 is a horizontal section taken substantially along the line 3—3 of FIG. 1.

As best shown in FIG. 3 a pair of cams 180 and 181 are mounted on the same shaft 67 as the main conveyor chain sprocket 65. These cams 180 and 181 operate electric switches 182 and 183 respectively which operate solenoids (not shown) to effect actuation of the uprighting power cylinder 58 and the wringing roll power cylinder 153. It will be evident, therefore, that the uprighting tray 52 is pivotal from its horizontal position and the wringing roll assembly pivotal between its FIGS. 12 and 15 positions in timed sequence with the speed of movement of the main conveyor chain 3.

It is believed that the operation of the end feeding machine will be apparent from the above description. In summary, packages of covers are laid on the storage table and chute 26 where, as used, they roll down the incline into the uprighting device 28. At the proper interval and timed from the conveyor chain 30 by the switch 182, the uprighting tray 52 is rotated by power cylinder 58 and cam 66 and the package placed upright in the conveyor chain 30. The continuously moving conveyor chain 30 is driven from and timed with the closing machine 21 so that covers are fed in the same number as they are used. As the package of covers moves through guides 110 to 113 up the conveyor chain 30, two paper gathering rolls 90, 91 pinch the paper covering and pull it away from the covers where a knife 93 pierces and cuts one side of the covering. As the package progresses further up the conveyor chain 30 and the covering is cut through its full length, the wringer rolls 126, 127 contact the covering and strip the paper from the covers, leaving the covers stacked on a projection 80 on the conveyor chain 30. After passing between the wringer rolls 126, 127 the paper covering is deposited into a chute (not shown) for disposal. After the wrapping is removed, the stack of covers are carried around a rubber lined turnover wheel 35 that pinches the covers to support them during rotation and starts them down the other side of the machine toward the cover stack 37 of the closing machine 21. The conveyor chain supporting projections 80, which are somewhat U-shaped and made to contact only the flange of the cover, are controlled and held in position by rollers 82 on each side of the conveyor chain 30. Four of the rollers 82 may be used to control each supporting link, the latter being controlled by running the rollers 82 in guides on either side of the conveyor chain 30. At the proper point established for dropping the stack of covers into the colsing machine chute 37, the guides 170 are curved slightly which quickly withdraws the supporting projection 80 from under the edge of the covers and drops the stack into the closing machine chute 37.

It will be understood that various alternate arrangements may be employed. For example, the various sprocket and chain drives may be replaced by pulleys, belts or gear trains. Similarly, various parts may be changed or modified to accommodate different size or different shaped articles.

It is thought that the invention and many of its attendant advantages will be understood from the foregoing description and it will be apparent that various changes may be made in the form, construction and arrangement of parts of the apparatus mentioned herein and in the steps and their order of accomplishment of the process (method) described herein, without departing from the spirit and scope of the invention or sacrificing all of its material advantages, the apparatus and process hereinbefore described being merely a preferred embodiment thereof.

We claim:

1. Apparatus for removing an outer wrapping from a longitudinal package containing a plurality of articles which are to be fed to and utilized in a container closing machine or the like, comprising conveyor means for moving said package along its longitudinal axis, gathering and slitting means disposed along the path of travel of said package operable to gather at least a portion of said wrapping and longitudinally sever said gathered wrapping, and wringing means operable to strip the severed wrapping from around said articles, said conveyor means continuously moving said package and articles as the outer wrapping is severed and removed.

2. Apparatus according to claim 1 further comprising a chute adapted to feed a plurality of horizontally disposed packages, and uprighting means operable to receive individual packages from said chute and transfer said packages to a vertical run of said conveying means with the axis of the package vertically disposed.

3. Apparatus according to claim 2 wherein said uprighting means comprises a tray pivotally mounted for movement between generally horizontal and vertical positions, and actuating means operable to pivot said tray between said positions.

4. Apparatus according to claim 3 wherein said actuating means comprises power means operatively connected to said tray to pivot the latter between a horizontal position and a position intermediate said horizontal and vertical positions, and cam actuated means for pivoting said tray between said intermediate position and said vertical position.

5. Apparatus according to claim 4 wherein said cam actuated means comprises a rotatable cam actuating a cam follower on said tray, said rotatable cam being driven off of said conveyor means thereby providing synchronized movement with the latter.

6. Apparatus according to the claim 4 wherein said power means comprises a power cylinder, a cam driven off of said conveyor means and controlling actuation of the power cylinder in synchronization with the conveyor means.

7. Apparatus according to claim 2 wherein said uprighting means comprises a gate mechanism operable to preclude feeding of packages from said chute when the tray is uprighting a previously fed package.

8. Apparatus according to claim 7 wherein said gate mechanism comprises means biasing a plate in the path of feed of said packages, said tray, upon return to said horizontal position, contacting said plate and moving the latter out of said path of feed of said packages and against said bias.

9. Apparatus according to claim 1 wherein said gathering and slitting means comprises a pair of rollers operable to gather at least a portion of said wrapping, and means defining a cutting edge to slit said gathered wrapping longitudinally.

10. Apparatus according to claim 9 wherein said gathering and slitting means further comprises means rotatably supporting said rollers with their axes converging such that each roller rotates in a plane disposed at an acute angle relative to the path of travel of said package whereby the rollers produce a vertical component of force acting on the wrapping.

11. Apparatus according to claim 10 wherein said means defining said cutting edge is disposed between the rollers in a position to sever the gathered wrapping as the latter is urged upwardly towards said cutting edge by said vertical component of force.

12. Apparatus according to claim 9 wherein said gathering and slitting means comprises a backing roll supporting the package on a side thereof generally opposite the gathering rollers.

13. Apparatus according to claim 1 wherein said wringing means comprises a pivotally supported wringer arm assembly rotatably mounting a pair of wringer rolls, and power means operable to pivot said assembly between a first position wherein the wringer rolls pull the wrapping therebetween as the package is carried by said conveyor means and a second position spaced from the path of travel of the package where the wrapping is discharged from between the wringer rolls.

14. Apparatus according to claim 13 wherein said power means comprises a power cylinder and a cam driven off of said conveyor means and controlling actuation of the power cylinder in synchronization with the conveyor means.

15. Apparatus according to claim 13 wherein said wringer arm assembly comprises support brackets each pivotally mounting a pair of arms, means rotatably mounting said wringer rolls on said arms, and biasing means urging said arms in a pivotal direction to urge said wringer rolls towards one another.

16. Apparatus according to claim 15 further comprising adjustable stop means for varying the distance and contact pressure between said two wringer rolls, and means for adjusting the pivotal position of said two arms.

17. Apparatus according to claim 1 further comprising turnover means operable to support said articles after the wrapping has been stripped therefrom to facilitate transference of the articles from an upward moving run of the conveyor means to a generally downward moving run thereof.

18. Apparatus according to claim 17 wherein said turnover means comprises a turnover wheel having spaced resilient elements adapted to resiliently hold the sides of the articles as the latter are carried up over the turnover wheel.

19. Apparatus according to claim 17 wherein said conveying means has spaced projections adapted to support a plurality of said articles on said generally downward run, and guide means cooperating with said conveyor means and predetermining the path of travel of the latter, said guide means having an arcuate section which changes the path of travel of said conveyor means in a manner such that a projection is withdrawn from a supporting position for said plurality of articles and the latter are free to fall to a receiving chute.

20. Apparatus for removing an outer wrapping from a longitudinal package containing a plurality of closure ends and feeding the latter to a closing machine, comprising a chute for feeding a plurality of horizontally disposed packages, uprighting means operable to receive from said chute individual packages and upright the latter to a position where its axis is vertically disposed, a conveyor means receiving said vertically disposed package and moving the latter along its longitudinal axis, gathering means along the path of travel of said package operable to engage and gather at least a portion of said wrapping, a knife disposed to sever the gathered wrapping along a longitudinal side thereof as the package is conveyed upward by said conveying means, wringing means operable to strip the wrapping from around said articles, and turnover means operable to support said articles to facilitate transference of the latter from an upward moving run of the conveying means to a generally downward moving run thereof.

21. The method of removing an outer wrapping from a longitudinally extended package containing a plurality of articles, comprising the steps of continuously moving said package along its longitudinal axis, gathering at least a portion of said wrapping during said continuous movement of said package, severing said gathered wrapping by making a longitudinal cut on a side thereof, stripping said wrapping from around said articles, and continuously moving said articles from which the wrapping has been removed.

22. The method according to claim 21 further comprising the step of uprighting a horizontally disposed package prior to continuously moving it along its longitudinal axis.

23. The method according to claim 21 wherein said step of continuously moving said package along its longitudinal axis comprises conveying the package vertically upwardly, said step of continuously moving said articles from which the wrapping has been removed comprising changing the direction of movement of said articles from a generally vertically upward to a generally vertical downward direction, and freeing said articles for free fall to a receiving chute.

24. The method according to claim 21 wherein the step of supporting the wrapper while making a longitudinal cut comprises directing forces to pull the wrapping generally radially from the package and to urge the pulled wrapping in a longitudinal direction while it is being cut.

References Cited

UNITED STATES PATENTS 2,206,984 7/1940 Vogt _____ 214—305 X
3,022,912 2/1962 Vincent _____ 214—305

HUGO O. SCHULZ, *Primary Examiner.*

U.S. Cl. X.R.

198—54, 168